(12) United States Patent
Golubkov

(10) Patent No.: US 10,381,633 B2
(45) Date of Patent: Aug. 13, 2019

(54) BUSBAR

(71) Applicant: Samsung SDI Co., Ltd., Yongin-si, Gyeonggi-do (KR)

(72) Inventor: Andrej Golubkov, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 61 days.

(21) Appl. No.: 15/278,938

(22) Filed: Sep. 28, 2016

(65) Prior Publication Data

US 2017/0098814 A1    Apr. 6, 2017

(30) Foreign Application Priority Data

Oct. 6, 2015  (EP) ...................................... 15188460

(51) Int. Cl.
| | |
|---|---|
| H01M 2/34 | (2006.01) |
| H01M 2/20 | (2006.01) |
| H01R 9/00 | (2006.01) |
| H01R 13/696 | (2011.01) |
| B60L 50/50 | (2019.01) |
| H01M 2/10 | (2006.01) |

(Continued)

(52) U.S. Cl.
CPC ............ *H01M 2/348* (2013.01); *B60L 50/50* (2019.02); *H01M 2/206* (2013.01); *H01R 9/00* (2013.01); *H01R 13/696* (2013.01); *H01M 2/1077* (2013.01); *H01M 2200/10* (2013.01); *H01M 2200/103* (2013.01); *H01M 2220/20* (2013.01); *H01R 4/029* (2013.01); *H01R 4/58* (2013.01); *Y02T 10/7005* (2013.01)

(58) Field of Classification Search
CPC .................................................. H01R 13/696
See application file for complete search history.

(56) References Cited

U.S. PATENT DOCUMENTS

| | | | |
|---|---|---|---|
| 6,377,432 B1* | 4/2002 | Hashimoto | ............ H01H 85/36 361/103 |
| 2004/0050714 A1* | 3/2004 | Torvund | .................... C25C 3/16 205/560 |
| 2018/0026250 A1* | 1/2018 | Mattmuller | ........... H01M 2/206 |

FOREIGN PATENT DOCUMENTS

| | | |
|---|---|---|
| EP | 2 937 916 A1 | 10/2015 |
| JP | 11-54007 A | 2/1999 |

(Continued)

OTHER PUBLICATIONS

Engineering ToolBox, (2003). Coefficients of Linear Thermal Expansion. [online] Available at: https://www.engineeringtoolbox.com/linear-expansion-coefficients-d_95.html (Year: 2003).*

(Continued)

*Primary Examiner* — Christopher P Domone
(74) *Attorney, Agent, or Firm* — Lewis Roca Rothgerber Christie LLP

(57) ABSTRACT

The present invention refers to a busbar for electrically connecting a plurality of cells of a battery module. In order to electrically disconnect the battery cells from each other upon thermal runaway of at least one of the cells or short circuit, the busbar includes a core and a shell at least partially made of a first material, said first material being an electrically conducting material, wherein the core is at least partially made of a second material having a coefficient of thermal expansion which is significantly higher than the coefficient of thermal expansion of the first material.

10 Claims, 2 Drawing Sheets

(51) Int. Cl.
   *H01R 4/02*     (2006.01)
   *H01R 4/58*     (2006.01)

(56)         References Cited

FOREIGN PATENT DOCUMENTS

JP      2002-358865 A      12/2002
   WO    WO 2015/002495 A1    1/2015

OTHER PUBLICATIONS

EPO Office Action dated Dec. 21, 2016, for corresponding European Patent Application No. 15188460.8 (5 pages).
European Search Report in corresponding European Application No. 15188460.8-1373, dated Feb. 15, 2016, 6 pages.

* cited by examiner

BUSBAR

CROSS-REFERENCE TO RELATED APPLICATION

This application claims priority to and the benefit of European Patent Application No. 15188460.8, filed on Oct. 6, 2015, in the European Patent Office, the disclosure of which is incorporated herein by reference in its entirety.

BACKGROUND

1. Field

Aspects of the present invention relate to a busbar for electrically connecting a plurality of cells of a battery module. The invention also relates to a battery module including such a busbar as well as to a vehicle including such a battery module and a method for construction of a busbar.

2. Description of the Related Art

A rechargeable battery differs from a primary battery in that it can be repeatedly charged and discharged, while a primary battery makes only an irreversible conversion of chemical energy to electrical energy. Low-capacity rechargeable batteries are used as the power supply for small electronic devices, such as cellular phones, notebook computers and camcorders, while high-capacity rechargeable batteries are used as the power supply for driving motors in hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. The case may have a cylindrical or rectangular shape depending on the purpose and the usage of the rechargeable battery, and electrolyte solution is injected into the case for charging and discharging of the rechargeable battery through an electrochemical reaction of the positive electrode, the negative electrode, and the electrolyte solution.

Rechargeable batteries may be used as a battery module formed of a plurality of unit batteries or cells coupled in series so as to be used to power a motor driving a hybrid vehicle that benefits from high energy density. For example, the battery module may be formed by connecting an electrode terminal of each of the plurality of unit batteries depending on the amount of power required for motor driving, such that a high-power rechargeable battery can be realized. The cells of the battery module usually are connected by a so-called "busbar", sometimes also called a "bussbar" or a "bus bar". Busbars are usually monolithic and made out of solid metal, because their primary (or sometimes only) function is to electrically connect the cells of the battery module with each other to transfer electrical currents between cells of the battery module.

In order to improve the safety of the battery module, heat generated from the rechargeable battery may be efficiently emitted, discharged and/or dissipated. If the heat emission/discharge/dissipation is not sufficiently performed, a temperature deviation may occur between the respective unit batteries, such that the battery module cannot generate a desired amount of power for motor driving. In addition, if the internal temperature of the battery increases due to the heat generated from the rechargeable battery, an abnormal reaction occurs therein and thus charging and discharging performance of the rechargeable deteriorates and the life-span of the rechargeable battery is shortened. Thus, a cooling device that can cool the rechargeable battery by effectively emitting/discharging/dissipating heat generated from the battery can improve the safety, performance, and life-span of the rechargeable battery.

In case of failure of the heat dissipater or the cooling device, respectively, or due to another malfunction in one of the battery cells, for example an internal short circuit, thermal runaway of a cell can occur. Due to the busbar being monolithic and made of solid metal, which conducts heat at a high rate, heat is transferred to the neighboring cells of the battery module. It is desirable to reduce, minimize, or eliminate this effect, because overheating and thus failure of the cells can occur, leading to complete failure and possibly the destruction of the battery module.

Further, in case of an internal short circuit in the battery system, e.g. due to deformation of the battery system during an impact or an accident, the monolithic metal busbar maintains the short circuit current. Hence, heat dissipation continues, possibly affecting other cells of the battery modules or other components of the vehicle or of the device which the battery module is part of.

SUMMARY

According to one embodiment of the present invention, a busbar for electrically connecting a plurality of cells of a battery module includes: a core and a shell at least partially made of a first material, said first material being an electrically conducting material, wherein the core is at least partially made of a second material having a coefficient of thermal expansion significantly higher than the coefficient of thermal expansion of the first material.

The shell may have breaking points.

The shell may be configured to break when the busbar reaches a threshold temperature.

The second material may be an electrical insulator.

The core may be partially made of a third material.

The third material may be an electrical insulator.

According to one embodiment of the present invention, a battery module may include a busbar as described above.

According to one embodiment of the present invention, a vehicle may include a battery module as described above.

The battery module may include cells with tabs that are welded to the busbar.

According to one embodiment of the present invention, a method for manufacturing a busbar includes: providing a shell at least partially made of a first material, which first material is an electrically conducting material, providing a core at least partially made of a second material, which second material has a coefficient of thermal expansion which is higher than the coefficient of thermal expansion of the first material, precooling the core, and joining the core and the shell to form the assembled busbar.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
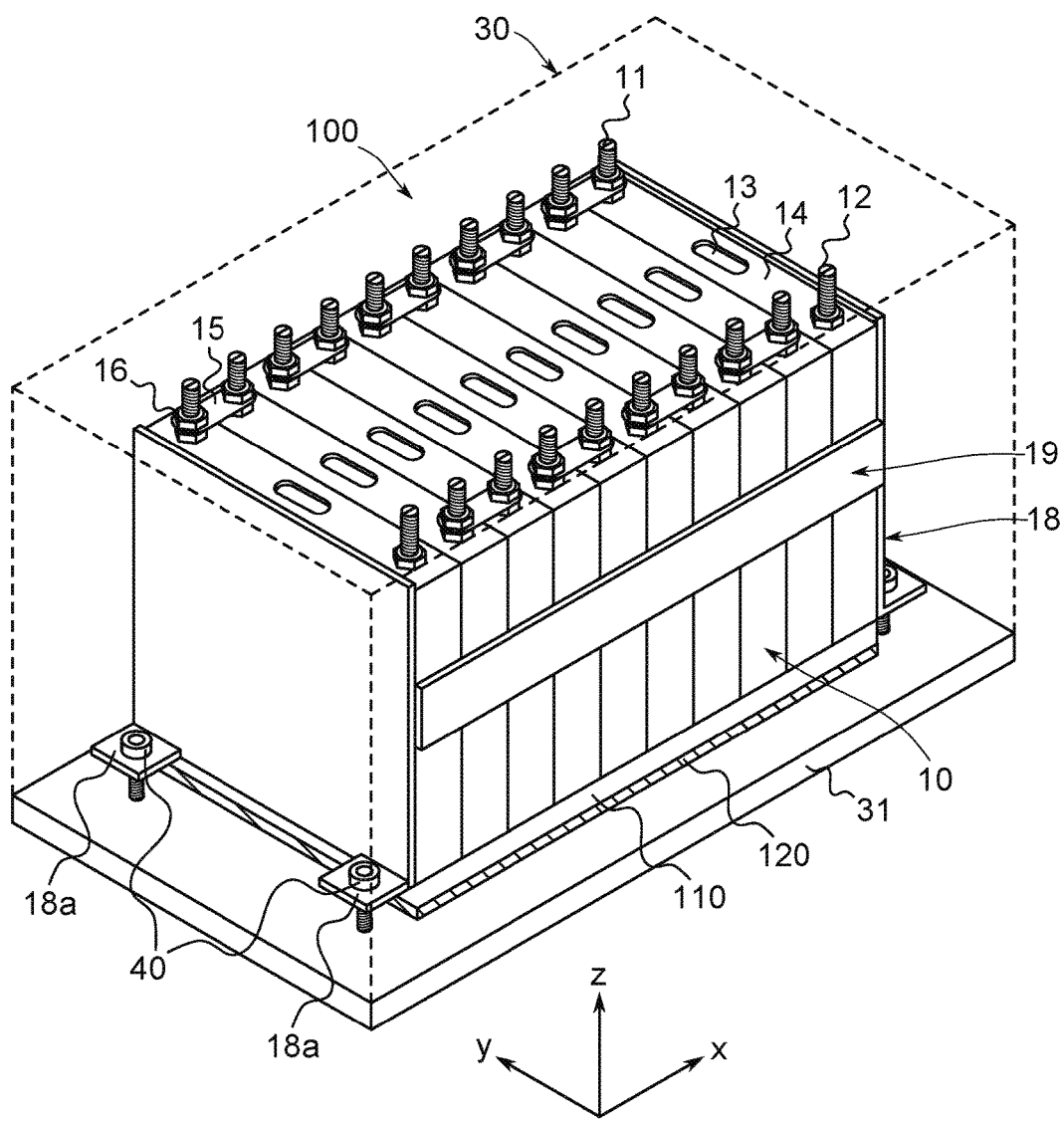
FIG. 1 is a perspective view of a comparative battery module.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

According to one embodiment of the present invention, a busbar for electrically connecting a plurality of cells of a battery module is provided, including: a core, and a shell at least partially made of a first material, which first material is an electrically conducting material, wherein the core is at least partially made of a second material having a coefficient of thermal expansion which is significantly higher than the coefficient of thermal expansion of the first material. In other words, the busbar is not made of a monolithic piece of solid metal, but has an internal structure that allows the busbar to take on additional functions. If properly designed, the busbar can function as a safety structure that electrically disconnects the cells of the battery module from each other in case of thermal runaway in one of the cells. For this purpose, the busbar can be designed in a way that, if a threshold temperature (or a predetermined temperature threshold) is exceeded, the busbar material breaks due to the different coefficients of thermal expansion and the heat and current transport through the busbar is interrupted. For example, the shell may break due to the core's increase in volume. The shell can partially or also exclusively be made of the first material. For example, in the context of this specification, the shell is considered to be "broken" if it has separated into at least two separate parts which are not substantially connected with each other.

The thermal coefficient α of thermal expansion is a material constant and describes the response of a material to a change in temperature. It is defined by the equation $$a = \frac{1}{L}\frac{dL}{dT},$$

where L is the length of a body under investigation and T is the temperature. In the context of this specification, a coefficient is considered to be "significantly higher" than another coefficient if it exceeds the value of the other coefficient by at least 10%, preferably by at least 20%. In one embodiment of the invention, the difference in values of the respective coefficients leads to visible differences in the busbar's different materials' expansions upon a change in temperature of 80 K. In some embodiments of the present invention, the two different materials are selected such that the difference between coefficients of thermal expansion of the at least two different materials have the characteristic that, in combination with other specifications such as dimensions, e.g. thickness of the shell and the core, respectively, the shell breaks at the threshold temperature (e.g., the predetermined temperature).

On the other hand, the busbar according to embodiments of the present invention can tolerate moderate changes in temperature without electrically disconnecting the battery cells from each other, because, during operation of the busbar, the temperature may change within certain parameters. Also, the battery module is designed to be able to operate in different conditions, such as for example ambient temperatures between −10° C. and 40° C. Hence, the busbar according to embodiments of the present invention can endure certain temperature differences without disconnecting the cells from each other.

Although the invention specifically aims to improve a busbar for a battery module, such busbar may be useful in any application where comparative busbars are used and where local heat generation can occur.

According to one embodiment of the invention, at least the shell of the busbar breaks upon exceeding of the temperature threshold. The busbar is made of at least two different materials and includes a core and a shell. The shell surrounds the core. The shell may surround the core such that the core is fully embedded in the shell and no part of the core is visible from the outside, leaving no way for the core to expand without breaking the shell. However, in some embodiments, the core is only partially surrounded by the shell. For example, there may be one side with an opening through which the core can be entered (e.g. inserted) into the shell. The shell may completely separate the core from the area where the busbar is connected to the battery cell. The opening may then be arranged to be on the side of the busbar opposite of the site facing the battery module.

The aim of the core is to break the shell when the temperature threshold is exceeded. The threshold temperature can for example be 50° C., 75° C. or 100° C. The core can be made out of a material having a large coefficient of thermal expansion. Therefore, the core's expansion due to thermal intake (or heat intake) is greater than the expansion of the shell. Hence, a tension builds up in the shell during heating of the busbar, eventually resulting in structural failure of the shell. If the electrical connection of the cells is provided solely by the shell, which is made of an electrically conductive material, breaking of the shell results in electrical disconnection of the cells, preventing any further electrical current flowing from the location of the malfunction to still functional cells. Heat transfer from one cell to another can be reduced as well. The shell can for example be made of aluminum, copper or iron.

The core can be partially made of a third material, said third material being different from the first and second materials. It is thus possible to further adjust the busbar's properties to the desired function. For example, the second material can be a material with a large coefficient of thermal expansion and the third material can be an electrical insulator. The busbar can then be designed such that upon breaking of the shell not only heat transfer is effectively reduced, but also current transfer is reduced or eliminated. To achieve this, the busbar can, for example, be designed in a way that, if the electrically conducting shell is broken, the part of the core connecting the two parts of the busbar where the parts of the shell surrounding the core are still intact is made solely of the third material, which in this case would be an electrical insulator. In other words, as long as the busbar is intact, the area where the shell is expected to break upon an increase in temperature is in contact with a part or parts of the core that are made of electrically insulating material only.

The same effect can be achieved if the second material is also an electrical insulator. If the second material combines the features of large coefficient of thermal expansion and good electrical and/or thermal insulating properties, it is sufficient if the core is made only of the second material. However, it is equally possible and sometimes advantageous to distribute the desired properties, e.g. thermal expansion coefficient and electrical and/or thermal insulation, between two different materials, e.g. the second and third materials, which constitute the core of the busbar. According to this embodiment, a specific geometric arrangement is, which will become clear from the figures depicted below as well as the accompanying description.

In one embodiment, the shell has breaking points (or predetermined breaking points). This feature makes it possible to precisely control the busbar's behavior during exceeding of the thermal threshold. The breaking points can, for example, be realized by reducing the cross section of the shell, thus reducing the shell's strength in those areas having a smaller cross section. If the battery cell's temperature rises, the core of the busbar expands. Due to the significantly higher coefficient of thermal expansion of the core material compared to the shell material, the core expands at a greater rate than the shell, resulting in a tensile force that is exerted on the shell. At the breaking points, the force required to break the shell is smaller compared to the rest of the shell. The shell's structure thus at first fails at the breaking points. Due to the shell breaking, no electrical current can flow through the shell anymore. If the shell is broken, it collapses into at least a first part and a second part. The first part may be still electrically connected to one of the battery cells, while the second part may be electrically connected to another battery cell. However, no electrical contact is maintained between the first and second part of the shell. Hence, no electrical contact is maintained between the single battery cells as well.

According to some embodiments of the present invention, the material of the core is an electrical insulator at least in the areas of the breaking points so that no current can be transferred from one cell to another through the core as well. Thus, no bypass through the core is available to an electric current, making it impossible for any electric current to flow from one part of the shell to the other, more specifically, from the first part of the core, which is electrically connected to a first battery cell, to the second part of the core, which is electrically connected to a second battery cell. After the shell is broken, the function of the busbar changes from electrical connector to electrical insulator, stopping any electrical currents from flowing between the battery cells originally connected by the busbar.

Instead of reducing the core's cross section, in some embodiments, the strength of the breaking points is weakened by other means, for example by perforation of the shell or using another material at the breaking points.

Depending on the specific requirements of the application, the busbar can be designed so that the shell breaks at a threshold temperature (e.g., a predetermined temperature). A temperature just outside of the regime of safe operating temperatures, or plus a margin of error, is suitable as a threshold temperature for breaking of the shell.

The second material may be a material with a large coefficient of thermal expansion, for example a zinc alloy. Zinc alloys can have a thermal expansion coefficient of up to $39*10^{-6}K^{-1}$. The third material may be an electrical insulator. Further, it is advantageous if the third material is a hard material. A suitable material showing these properties is for example zirconium dioxide.

According to another aspect of the present invention, a battery module including a busbar as described is provided. In a one embodiment, the battery module includes a connector for electrically connecting the single battery cells with the busbar. The connector can be tabs that can be welded to the busbar or any other known electrode terminals. Such a welded connection secures a mechanically robust electrical connection with low electrical resistance. Any other suitable fastener, such as nuts and bolts or the like are also possible.

According to another aspect of the present invention, a vehicle including a battery module as defined above is provided. The vehicle can typically be a car, motorcycle or similar vehicle. The invention is especially suitable for use in a hybrid vehicle, an electric car (or e-car) or the like.

According to yet another aspect of the invention, a method for constructing a busbar is provided. To construct a busbar according to one embodiment of the present invention, a shell at least partially made of a first material, said first material being an electrically conducting material, and a core at least partially made of a second material, said second material having a coefficient of thermal expansion which is higher than the coefficient of thermal expansion of the first material, are provided. The core then is precooled (or cooled) and subsequently joined with the shell. The joining can include pressing the core into a central perforation provided in the shell. The second material may have a large coefficient of thermal expansion. A coefficient of thermal expansion a is to be considered "large" in the context of the present specification if its value is higher than $20*10^{-6}K^{-1}$, or may be higher than $25*10^{-6}K^{-1}$.

Further aspects of the present invention could be learned from the dependent claims or the following description.

Referring to FIG. 1, an exemplary embodiment of a comparative battery module 100 includes a plurality of battery cells 10 arranged or aligned in one direction and a heat exchange member 110 provided adjacent to (e.g., contacting) a bottom surface of the plurality of battery cells 10. A pair of endplates 18 are provided to face wide surfaces of the battery cells 10 at the outside of the battery cells 10, and a connection plate 19 is configured to connect the pair of end plates 18 to each other thereby fixing the plurality of battery cells 10 together. Fastening portions 18a on both sides of the battery module 100 are fastened to a support plate 31 by bolts 40. The support plate 31 is part of a housing 30.

Here, each battery cell 10 is a prismatic (or rectangular) cell, the wide flat surfaces of the cells being stacked together to form the battery module. Further, each battery cell 10 includes a battery case configured for accommodation of an electrode assembly and an electrolyte. The battery case is hermetically sealed by a cap assembly 14. The cap assembly 14 is provided with positive and negative electrode terminals 11 and 12 having different polarities, and a vent 13. The vent 13 is a safety feature of the battery cell 10, which acts as a passage through which gas generated in the battery cell 10 is exhausted (or vented) to the outside of the battery cell 10 (or the outside of the battery case). The positive and negative electrode terminals 11 and 12 of neighboring battery cells 10 are electrically connected to the positive and negative electrode terminals 11 and 12 through a busbar 15, and the busbar 15 may be fixed by a nut 16 or the like. Hence, the battery module 100 may be used as power source unit by electrically connecting the plurality of battery cells 10 as one bundle.

Generally, the battery cells 10 generate a large amount of heat while being charged/discharged. The generated heat may accumulate in the battery cells 10, thereby accelerating the deterioration of the battery cells 10. Therefore, the battery module 100 further includes a heat exchange member 110, which is provided adjacent to (e.g., in contact with) the bottom surface of the battery cells 10 so as to cool down the battery cells 10. In addition, an elastic member 120 made of rubber or other elastic materials may be interposed between the support plate 31 and the heat exchange member 110.

The heat exchange member 110 may include a cooling plate provided to have a size corresponding to that of the bottom surface of the plurality of battery cells 10, e.g., the cooling plate may completely overlap the entire bottom surfaces of all the battery cells 10 in the battery module 100. The cooling plate may include a passage through which a coolant can move. The coolant performs a heat exchange with the battery cells 10 while circulating inside the heat exchange member 110, e.g., inside the cooling plate.

Figure 2:
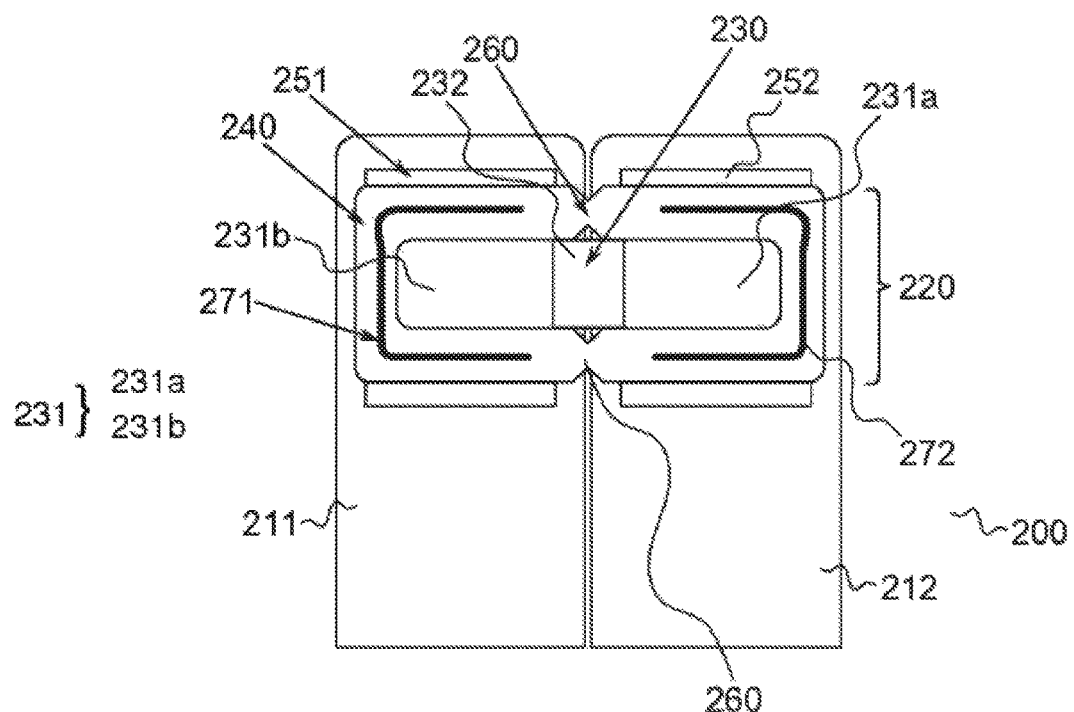
FIG. 2 is a cross-sectional view of a battery module in working condition according to one embodiment of the present invention.

FIG. 2 illustrates an exemplary embodiment of the invention in working (or operating) condition when the busbar is electrically conductive. It shows a battery module 200 in a top cross-sectional view including two cells, namely first cell 211 and second cell 212. Generally, the battery module could, for example, be a standard module as depicted in FIG. 1. Hence, more cells could be present, however, for the sake of convenience, and without limiting embodiments of the present invention thereto, a battery module with only two battery cells is shown. The cells 211, 212 have respective cell tabs 251, 252 for establishing electrical contact between the cells 211, 212. Tabs 251, 252 function as electrode terminals. Busbar 220 is welded to the cell tabs 251, 252, thus electrically connecting the cells 211, 212 with each other via welds 271, 272. Busbar 220 is shown in a cross-sectional view, making the internal structure of the busbar 220 visible. Busbar 220 includes a core 230 and a shell 240 which surrounds the core 230 on all sides. In other words, core 230 is embedded in shell 240. Shell 240 is made of an electrically conducting material, typically a metal. The shell 240 has breaking points (or predetermined breaking points) 260, where the shell's cross section is smaller compared to the rest of shell 240. In other words, material thickness of shell 240 is smaller or reduced at the breaking points 260. This can, for example, be achieved by removing material of the shell 240 after construction of the busbar 220 or by manufacturing the shell 240 such that it has the desired shape and cross section before construction of the busbar 220. Breaking points 260 are arranged in the central area of busbar 220. Breaking points 260 are not in physical contact with any of cells 211, 212.

Core 230 is arranged inside the shell 240. In one embodiment, it is made of two different materials constituting two different sections of core 230. Hence, core 230 includes first section 231 and second section 232. The first section 231 of core 230 is made of an expansion material. First section 231 is divided in two parts 231a and 231b, which are identical in structure but spatially separated from each other (e.g., separated by the second section 232). The material of first section has a high coefficient of thermal expansion. First section 231 can, for example, be made of a zinc alloy, which typically has a coefficient of thermal expansion of about $28.0*10^{-6}K^{-1}$. Upon heating, the volume of the first section increases at a higher rate than the volume of shell 240, putting mechanical tensile stress on shell 240 and eventually breaking the shell 240 at the breaking points 260 when the limit of the tensile strength of the shell material is exceeded, thus creating a gap between broken parts of shell 240, as will later be shown in FIG. 3.

Second section 232 may be made of a material having a coefficient of thermal expansion which is lower than the respective coefficient of first section. However, in one embodiment, said coefficient of second section 232 is not lower than the coefficient of the material shell 240 is made of. Shell 240 can for example be made of aluminum, which has a coefficient of thermal expansion of $23.8*10^{-6}K^{-1}$.

Breaking points 260 are arranged such that breaking of shell 240 at breaking points 260 results in termination (or severing) of the electrical connection between cells 211, 212. Hence, breaking points 260 are arranged such that they are not in contact with any of the cell tabs 251, 252. Breaking points 260 may also be regarded as "breaking lines" or "breaking areas", because they can cover the whole circumference of busbar 220.

The second section 232 of core 230 is made of a material different from the material of the first section. In one embodiment, the material of the second section 232 is an electrical insulator, for example zirconium dioxide, which has a coefficient of thermal expansion of $10.3*10^{-6}K^{-1}$. Second section 232 of core 230 is arranged in direct vicinity (e.g., adjacent) to breaking points 260. In other words, breaking points 260 are in physical contact only with second section 232 but not with first section of core 230.

Figure 3:
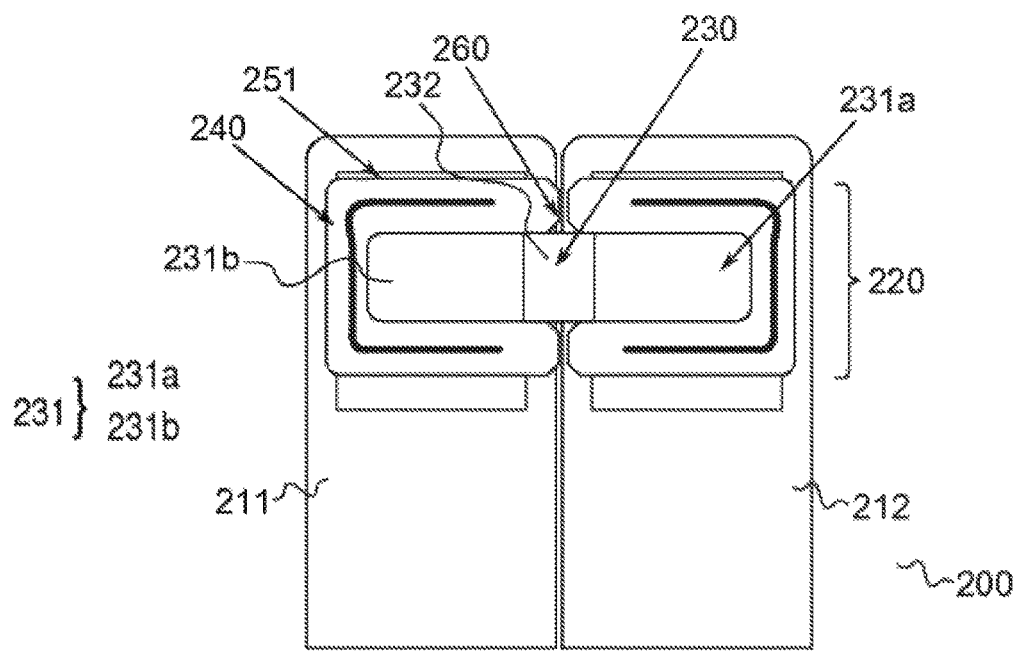
FIG. 3 is a cross-sectional view of the embodiment of FIG. 2 in a configuration after thermal runaway in one of the battery cells.

FIG. 3 shows the embodiment of FIG. 2 in a non-working interrupted condition after thermal runaway in cell 212. The part of busbar 220 which is connected to cell 212 has absorbed part of the heat generated in cell 212. Consequently, thermal expansion has occurred. The right part of first section 231a of core 230 has expanded at a significantly higher rate than the rest of busbar 220, including shell 240. Pressure has built up inside shell 240, resulting in the breaking of shell 240 at the breaking points 260. Hence, electrical connection of cell 211 with cell 212 via shell 240 has been terminated. Because central section 232 of core 230 is made of an electrically insulating material, no current can flow from the right part 231a of first section to the left part 231b or vice versa. Cell tabs 251, 252 thus have been electrically disconnected from each other.

As an added benefit, heat transfer between cells 211, 212 is greatly diminished. Comparative busbars made of solid metal are usually excellent heat conductors. Shell 240 no longer provides any kind of connection (e.g., electrical connection or thermal connection) between cells 211, 212. Hence, no heat is transferred from cell 211 to cell 212 via shell 240 or vice versa. The material of the central section 232 of core 230 is an electrically insulating material, said material can be chosen to be a good insulator against heat transfer (e.g., good thermal insulator) as well. Thus, heat transfer between cells 211, 212 is reduced so that thermal runaway in one of the cells 211, 212 does not cause damage to the other cell.

Busbar 220 therefore acts similar to a fuse. The breaking of busbar 220 is activated by overtemperature. The overtemperature of busbar 220 can, for example, either be caused by external sources, e.g. thermal runaway of a neighboring cell 211, 212, or by joule heat from overcurrent through the busbar 220, which for example could be caused by a short circuit.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A busbar for electrically connecting a plurality of cells of a battery module, the busbar comprising:
   a core comprising a second material; and a shell surrounding a periphery of the core and comprising a first material, the first material being an electrically conducting material, wherein the second material has a coefficient of thermal expansion significantly higher than the coefficient of thermal expansion of the first material, and wherein the shell is configured to break when the busbar reaches a threshold temperature.

2. The busbar of claim 1, wherein the shell has breaking points.

3. The busbar of claim 1, wherein the core further comprises a third material.

4. The busbar of claim 3, wherein the third material is an electrical insulator.

5. The busbar of claim 4, wherein the shell has breaking points.

6. A battery module comprising the busbar according to claim 1.

7. A vehicle comprising the battery module according to claim 6.

8. The battery module of claim 6, wherein the battery module comprises cells with tabs that are welded to the busbar.

9. A method for manufacturing a busbar, the method comprising:

precooling a core, the core comprising a second material; and joining the core and a shell such that the shell surrounds a periphery of the core to form the busbar, the shell comprising an electrically conductive first material, the second material having a coefficient of thermal expansion which is significantly higher than the coefficient of thermal expansion of the first material, the shell being configured to break when the busbar reaches a threshold temperature.

10. A busbar for electrically connecting a plurality of cells to each other, the busbar comprising:

a core comprising:
  a plurality of electrically conductive tab connecting portions; and
  an electrically insulative portion between the tab connecting portions and electrically separating the tab connecting portions from each other; and an electrically conductive shell around the core, the tab connecting portions being electrically connected to each other via the shell, wherein the shell is configured to break when the busbar reaches a threshold temperature.

* * * * *